US012706309B2

(12) United States Patent
Takahashi et al.

(10) Patent No.: US 12,706,309 B2
(45) Date of Patent: Aug. 11, 2026

(54) ALKALI DRY CELL

(71) Applicant: Panasonic Intellectual Property Management Co., Ltd., Osaka (JP)

(72) Inventors: Yasufumi Takahashi, Hyogo (JP); Takayuki Nakatsutsumi, Osaka (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 59 days.

(21) Appl. No.: 17/438,555

(22) PCT Filed: Dec. 4, 2019

(86) PCT No.: PCT/JP2019/047414
§ 371 (c)(1),
(2) Date: Sep. 13, 2021

(87) PCT Pub. No.: WO2020/188900
PCT Pub. Date: Sep. 24, 2020

(65) Prior Publication Data

US 2022/0149375 A1 May 12, 2022

(30) Foreign Application Priority Data

Mar. 18, 2019 (JP) ................................ 2019-049510

(51) Int. Cl.
*H01M 4/62* (2006.01)
*H01M 4/02* (2006.01)
(Continued)

(52) U.S. Cl.
CPC ............... *H01M 4/62* (2013.01); *H01M 4/06* (2013.01); *H01M 6/06* (2013.01); *H01M 2004/027* (2013.01)

(58) Field of Classification Search
CPC ........................... H01M 6/06–12; H01M 6/62
See application file for complete search history.

(56) References Cited

U.S. PATENT DOCUMENTS

2005/0130035 A1 * 6/2005 Inada ................ H01M 10/0587 429/340
2006/0115731 A1 6/2006 Oya et al.
(Continued)

FOREIGN PATENT DOCUMENTS

JP S62213067 A * 9/1987 ............. H01M 6/06
JP 63-239770 A 10/1988
(Continued)

OTHER PUBLICATIONS

JP-63248062-A English machine translation (Year: 2023).*
(Continued)

*Primary Examiner* — Armindo Carvalho, Jr.
(74) *Attorney, Agent, or Firm* — WHDA, LLP

(57) ABSTRACT

An alkaline dry battery including: a positive electrode; a negative electrode; a separator disposed between the positive electrode and the negative electrode; and an alkaline electrolyte retained in the positive electrode, the negative electrode, and the separator. The negative electrode includes a negative electrode active material containing zinc, and an additive. The additive includes a sulfur-containing cyclic compound.

6 Claims, 1 Drawing Sheet

(51) Int. Cl.
*H01M 4/06* (2006.01)
*H01M 6/06* (2006.01)

(56) References Cited

U.S. PATENT DOCUMENTS

| | | | | |
|---|---|---|---|---|
| 2009/0249614 A1* | 10/2009 | Davis | ...................... | H01M 6/04 |
| | | | | 423/605 |
| 2016/0336614 A1* | 11/2016 | Hatta | ...................... | B60L 50/64 |

FOREIGN PATENT DOCUMENTS

| | | | | | | |
|---|---|---|---|---|---|---|
| JP | 63248062 | A | * | 10/1988 | .............. | H01M 4/62 |
| JP | 02117066 | A | * | 5/1990 | .............. | H01M 4/42 |
| JP | 2006-156158 | A | | 6/2006 | | |
| JP | 2008-186703 | A | | 8/2008 | | |
| WO | WO-2015163254 | A1 | * | 10/2015 | .......... | H01M 10/052 |

OTHER PUBLICATIONS

JP-02117066-A English machine translation (Year: 2023).*
JPS62213067A English translation (Year: 2023).*
WO-2015163254-A1 English translation (Year: 2024).*
International Search Report dated Jan. 21, 2020, issued in counterpart International Application No. PCT/ JP2019/047414 (2 pages).

* cited by examiner

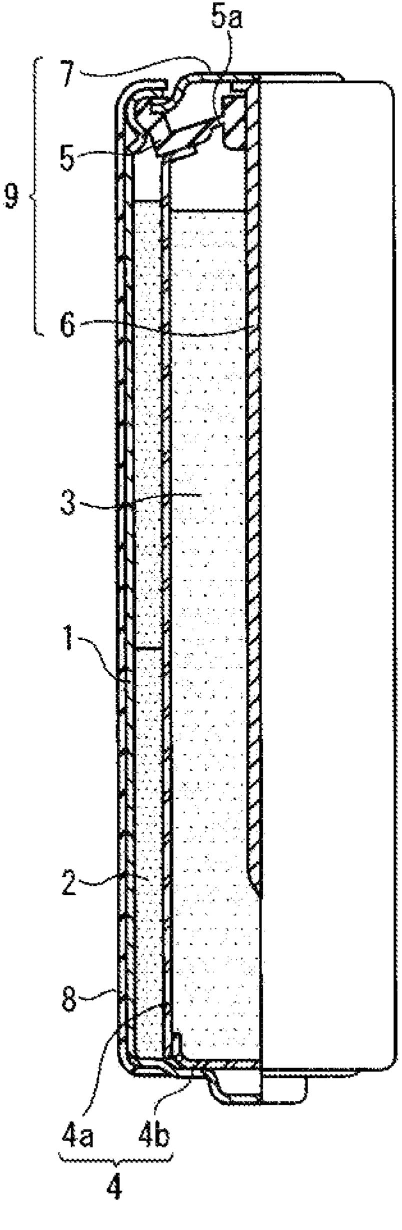
5a
7
5
9
6
3
1
2
8
4a
4b
4

ALKALI DRY CELL

TECHNICAL FIELD

The present invention relates to an improvement of a negative electrode of an alkaline dry battery.

BACKGROUND ART

Alkaline dry batteries (alkaline manganese dry batteries) have been widely used because of their large capacity as compared to those of manganese dry batteries and a large current that can be taken out therefrom. An alkaline dry battery includes a positive electrode, a negative electrode, a separator disposed between the positive electrode and the negative electrode, and an alkaline electrolyte retained in the positive electrode, the negative electrode, and the separator. The negative electrode includes a negative electrode active material containing zinc.

In the case of using a plurality of alkaline dry batteries in series connection in a device, it may occur that one of the alkaline dry batteries is mistakenly connected in reverse polarity, and charged. It may also occur that an alkaline dry battery, which is a primary battery, is mistakenly installed in a charger for a secondary battery, and charged.

When the alkaline dry battery is charged by misuse, hydrogen gas generates within the battery, and in association therewith, the battery internal pressure rises. The hydrogen generation increases as the charge proceeds, and when the battery internal pressure reaches a predetermined value, the safety vent is activated to release the hydrogen within the battery to the outside. Along with the release of the hydrogen to the outside, the alkaline electrolyte may leak outside, and the alkaline electrolyte having leaked outside may cause a malfunction of the device.

In order to suppress the leakage of the alkaline electrolyte to the outside when the alkaline dry battery is charged by misuse, Patent Document 1 discloses adding a zinc oxide to the alkaline electrolyte.

PATENT LITERATURE

[PTL 1] Japanese Laid-Open Patent Publication No. 2006-156158

SUMMARY OF INVENTION

When the alkaline dry battery is kept charged by misuse, at the negative electrode, zinc precipitation due to the reduction of the zinc ions in the electrolyte proceeds, decreasing the amount of zinc ions in the electrolyte. When the zinc ions in the electrolyte are decreased to a small amount, the resistance to the zinc precipitation reaction increases significantly, and the negative electrode electric potential drops rapidly and reaches a hydrogen generation potential at an early stage. As a result, the hydrogen generation increases, and the safety vent is activated to release the hydrogen, along with which the alkali electrolyte leaks outside.

One aspect of the present invention relates to an alkaline dry battery, including: a positive electrode; a negative electrode; a separator disposed between the positive electrode and the negative electrode; and an alkaline electrolyte retained in the positive electrode, the negative electrode, and the separator, the negative electrode including a negative electrode active material containing zinc, and an additive, the additive including a sulfur-containing cyclic compound.

According to the present invention, when the alkaline dry battery is charged by misuse, the leakage of the alkaline electrolyte to the outside of the battery can be suppressed.

BRIEF DESCRIPTION OF DRAWING

FIG. 1 A front view, partially shown in cross section, of an alkaline dry battery in one embodiment of the present invention.

DESCRIPTION OF EMBODIMENTS

An alkaline dry battery according to an embodiment of the present invention includes a positive electrode, a negative electrode, a separator disposed between the positive electrode and the negative electrode, and an alkaline electrolyte (hereinafter sometimes simply referred to as an electrolyte) retained in the positive electrode, the negative electrode, and the separator. The negative electrode includes a negative electrode active material containing zinc, and an additive. The additive includes a sulfur-containing cyclic compound.

The negative electrode is usually a mixture including a particulate negative electrode active material containing zinc, an additive, a gelling agent, and an electrolyte, and the whole is in a gel form. The sulfur-containing cyclic compound is, for example, dispersed in the electrolyte which is gelled by a gelling agent.

When an alkaline dry battery is charged by misuse, the zinc ions ($Zn^{2+}$) contained in the electrolyte are reduced at the negative electrode, causing a reaction that makes zinc precipitate on the surface of the negative electrode active material. Therefore, the negative electrode potential is maintained around −1.4 V (vs. Hg/HgO), which is the reduction potential of zinc ions. When the charge of the alkaline dry battery is further continued, the zinc ions in the electrolyte decrease, the resistance to the zinc precipitation reaction increases, and the negative electrode potential drops to or below −1.7 V (vs. Hg/HgO), which is the decomposition potential of the water in the electrolyte (hydrogen generation potential). The zinc ions in the electrolyte are present in the form of, for example, a zinc complex ion: $Zn(OH)_4^{2-}$.

On the other hand, by containing the additive in the negative electrode, the zinc precipitation reaction can be facilitated even when the amount of zinc ions in the electrolyte is small, which can delay the reaching of the negative electrode potential to the hydrogen generation potential. Therefore, even when the alkaline dry battery is charged by misuse, it is possible to suppress the hydrogen generation within the battery and prevent the leakage of the electrolyte to the outside of the battery.

When the negative electrode potential is lowered by charging, the sulfur-containing cyclic compound of the additive is reductively decomposed at the surface of the negative electrode active material, forming a surface film containing a decomposition product on the negative electrode active material. The surface film derived from the sulfur-containing cyclic compound presumably serves to reduce the resistance to the zinc precipitation reaction at the surface of the negative electrode active material.

The zinc ions contained in the electrolyte include, for example, ions leached out from a part of the zinc contained in the negative electrode active material into the electrolyte. Zinc oxide may be added to the electrolyte, to increase the amount of zinc ions contained in the electrolyte. The concentration of the zinc oxide in the electrolyte is, for example, 1 to 5 mass %.

The additive includes a sulfur-containing cyclic compound, and the sulfur-containing cyclic compound contains one or more sulfur atoms in its molecule and has one or more ring structures. Also, at least one of the ring structures may have at least one sulfur atom. When the sulfur atoms constitute a ring structure, the decomposition reaction through the ring-opening of the sulfur-containing cyclic compound (i.e., the surface film formation reaction) easily proceeds, and if misused, the zinc precipitation reaction at the surface of the negative electrode active material tends to be facilitated.

The sulfur-containing cyclic compound may be a cyclic compound containing sulfur and oxygen. Preferred is a compound containing a sulfur-to-oxygen double bond (S═O bond), because it can form a surface film with better quality. The sulfur-containing cyclic compound may further contain a carbon atom in its molecule and may include a fluorine atom bonded to the carbon atom.

The ring structure may have any number of atoms per one ring, but in terms of stability, it is, for example, a five-membered ring, and may be a six-membered ring. Among them, a five-membered ring is desirable. More desirably, the sulfur-containing cyclic compound has, in its molecule, one 5-membered ring and contains one sulfur atom, the sulfur atom being a constituent of the five-membered ring. In the following, such a sulfur-containing cyclic compound is sometimes referred to as a sulfur-containing five-membered heterocyclic compound. The sulfur-containing five-membered heterocyclic compound desirably occupies 80 mass % or more of the sulfur-containing cyclic compound, and may occupy 90 mass % or more. Substantially 100 mass % of the sulfur-containing cyclic compound may be the sulfur-containing five-membered heterocyclic compound.

The sulfur-containing cyclic compound may be, for example, a sulfur-containing cyclic ester. The sulfur-containing cyclic ester has a sulfur-to-oxygen double bond (S═O bond), and a sulfur-to-oxygen single bond (S—OR1 bond). More specifically, the sulfur-containing cyclic ester has a R2-(R1O)S═O ester bond. Here, R2 is a group bonded to a sulfur atom, and constitutes the ring structure together with the sulfur atom. In the compound having the ester bond as above, the decomposition reaction through ring-opening (i.e., the surface film formation reaction) is more likely to proceed, and if misused, the zinc precipitation reaction at the surface of the negative electrode active material tends to be facilitated. R1 and R2 each represents, for example, a hydrocarbon group, and may be a hydrocarbon group in which at least one of the hydrogen atoms may be substituted by a halogen atom such as fluorine, or by an alkyl group. R1 and R2 may form a ring.

The sulfur-containing cyclic ester may be, for example, at least one selected from the group consisting of a sulfate ester, a sulfite ester, and a sulfonate ester, or a derivative of them. The sulfate ester, the sulfite ester, the sulfonate ester, and/or the derivative of them is, for example, a 3-, 4-, 5-, or 6-membered cyclic compound, and is preferably a 5-membered cyclic compound. When the sulfur-containing cyclic ester has a hydrocarbon group, at least one of the hydrogen atoms in the hydrocarbon group may be substituted by a halogen atom such as fluorine, or by an alkyl group.

Specifically, examples of the sulfur-containing cyclic ester include 1,3-propanesultone, 1,3-propenesultone (1-propene 1,3-sultone), 1,4-butanesultone, 1,5-pentanesultone, 1-methyl-1,3-propanesultone, 2-methyl-1,3-propanesultone, 3-methyl-1,3-propanesultone, 2-trifluoromethyl-1,3-propanesultone, 1-fluoro-1,3-propanesultone, 2-fluoro-1,3-propanesultone, 3-fluoro-1,3-propanesultone, 1-methyl-1,3-propenesultone, 2-methyl-1,3-propenesultone, 3-methyl-1,3-propenesultone, 3-fluoro-1,3-propenesultone, 2-trifluoromethyl-1,3-propenesultone, ethylene sulfite (1,3,2-dioxathiolane 2-oxide), propylene sulfite, butylene sulfite, vinylene sulfite, fluoroethylene sulfite, ethylene sulfate (1,3,2-dioxathiolane 2,2-dioxide), sulfolane, 2-methylsulfolane, 3-methylsulfolane, 2-fluorosulfolane, and 3-fluorosulfolane. These may be used singly or in combination of two or more kinds. Preferred among them are 1,3-propanesultone, 1,3-propenesultone, ethylene sulfite, ethylene sulfate, and the like. At least one of the hydrogen atoms in the hydrocarbon group in these compounds may be substituted by a halogen atom such as fluorine, or an alkyl group.

The sulfur-containing cyclic compound is preferably retained in the negative electrode in an amount of, for example, 0.01 parts by mass or more and 2 parts by mass or less, per 100 parts by mass of the negative electrode active material included in the negative electrode, and may be retained in an amount of 0.02 parts by mass or more and 1 part by mass or less. When the amount of the sulfur-containing cyclic compound is in the above range, the hydrogen generation can be more effectively suppressed. Furthermore, the battery voltage can be easily maintained high, and the negative electrode active material can be easily packed in a sufficient amount.

In a different aspect, the sulfur-containing cyclic compound may be retained in the negative electrode, per 100 parts by mass of the electrolyte retained in the negative electrode, in an amount of 0.02 parts by mass or more and 4 parts by mass or less, or in an amount of 0.04 parts by mass or more and 2 parts by mass or less. When the amount of the sulfur-containing cyclic compound is in the above range, the hydrogen generation can be more effectively suppressed, and at the same time, the battery voltage can be easily maintained high, and the negative electrode active material can be easily packed in a sufficient amount.

The sulfur-containing cyclic compound retained in the negative electrode can be analyzed qualitatively and quantitatively by, for example, subjecting the electrolyte separated from the gel negative electrode to gas chromatography mass spectrometry (GC-MS), liquid chromatography mass spectrometry (LC-MS), nuclear magnetic resonance spectroscopy (NMR), ion chromatography, and the like.

The sulfur-containing cyclic compound is at least partially decomposed gradually within a completed battery. Therefore, the content of the sulfur-containing cyclic compound in, for example, the gel negative electrode taken out from the battery may be below the above range. It suffices when the sulfur-containing cyclic compound remains in the gel negative electrode in an amount equal to or greater than the detection limit.

Most of the sulfur-containing cyclic compound added in the negative electrode stays in the negative electrode. However, for example, part of the sulfur-containing cyclic compound contained in the electrolyte constituting the gel negative electrode may move into the electrolyte in the positive electrode. Therefore, the positive electrode may also include the sulfur-containing cyclic compound.

For viscosity adjustment and other purposes, the negative electrode may further include a surfactant and/or an aromatic compound. Examples of the surfactant include a polyoxyalkylene group-containing compound and a phosphoric acid ester, among which a phosphoric acid ester and an alkali metal salt thereof are preferred. A preferable examples of the aromatic compound is a terephthalic acid.

The alkaline dry battery according to an embodiment of the present invention includes, for example, a cylindrical battery and a coin battery.

A detailed description will be given below of an alkaline dry battery according to the present embodiment, with reference to the drawing. The present invention, however, is not limited to the following embodiment. Modification can be made as appropriate without departure from the scope in which the effect of the present invention can be exerted. Furthermore, any combination with another embodiment is possible.

FIG. 1 is a front view of an alkaline dry battery according to one embodiment of the present invention, with one half side shown in cross-section. FIG. 1 illustrates an example of an inside-out type cylindrical alkaline dry battery. As illustrated in FIG. 1, the alkaline dry battery includes a hollow cylindrical positive electrode 2, a gel negative electrode 3 disposed in the hollow of the positive electrode 2, a separator 4 interposed therebetween, and an electrolyte (not shown), which are all housed in a bottomed cylindrical battery case 1 serving as a positive electrode terminal. The electrolyte used here is an aqueous alkaline solution.

The positive electrode 2 is disposed in contact with the inner wall of the battery case 1. The positive electrode 2 includes a manganese dioxide and an electrolyte. In the hollow of the positive electrode 2, the gel negative electrode 3 is packed, with the separator 4 interposed therebetween. The negative electrode 3 usually includes a negative electrode active material containing zinc and the aforementioned additive, and in addition, an electrolyte and a gelling agent.

The separator 4 has a bottomed cylindrical shape and retains an electrolyte. The separator 4 is constituted of a cylindrically-shaped separator 4*a* and a bottom paper 4*b*. The separator 4*a* is disposed along the inner surface of the hollow of the positive electrode 2, to provide insulation between the positive electrode 2 and the negative electrode 3. The separator disposed between the positive electrode and the negative electrode means the cylindrically-shaped separator 4*a*. The bottom paper 4*b* is disposed at the bottom of the hollow of the positive electrode 2, to provide insulation between the negative electrode 3 and the battery case 1.

The opening of the battery case 1 is sealed with a sealing unit 9. The sealing unit 9 includes a gasket 5, a negative electrode terminal plate 7 serving as a negative electrode terminal, and a negative electrode current collector 6. The negative electrode current collector 6 is inserted into the negative electrode 3. The negative electrode current collector 6 has a nail-like shape having a head and a shank, and the shank is passed through a through-hole provided in the center cylindrical portion of the gasket 5. The head of the negative electrode current collector 6 is welded to the flat portion at the center of the negative electrode terminal plate 7. The opening end of the battery case 1 is crimped onto the flange at the circumference of the negative electrode terminal plate 7, via the peripheral end portion of the gasket 5. The outer surface of the battery case 1 is wrapped with an outer label 8.

A detailed description will be given below of the alkaline dry battery.

(Negative Electrode)

The negative electrode active material may be, for example, zinc or a zinc alloy. The zinc alloy may contain at least one selected from the group consisting of indium, bismuth, and aluminum, in view of the corrosion resistance. The indium content in the zinc alloy is, for example, 0.01 mass % to 0.1 mass %, and the bismuth content is, for example, 0.003 mass % to 0.02 mass %. The aluminum content in the zinc alloy is, for example, 0.001 mass % to 0.03 mass %. In view of the corrosion resistance, the element(s) other than zinc preferably occupies 0.025 mass % to 0.08 mass % of the zinc alloy.

The negative electrode active material is usually used in a powder form. In view of the packability of the negative electrode and the diffusibility of the electrolyte in the negative electrode, the average particle diameter (D50) of the negative electrode material powder is, for example, 100 μm to 200 μm, preferably 110 μm to 160 μm. In the present specification, the average particle diameter (D50) refers to a median diameter in a volumetric particle size distribution. The average particle diameter can be measured by, for example, using a laser diffraction/scattering type particle size distribution analyzer.

The negative electrode can be obtained by, for example, mixing a particulate negative electrode active material containing zinc, the aforementioned additive (sulfur-containing cyclic compound), a gelling agent, and an electrolyte.

The gelling agent may be any known gelling agent used in the field of alkaline dry batteries, and is, for example, a water-absorbent polymer. Examples of the gelling agent include polyacrylic acid and sodium polyacrylate. The gelling agent is added in an amount of, for example, 0.5 to 2.5 parts by mass per 100 parts by mass of the negative electrode active material.

For viscosity adjustment and other purposes, a surfactant and/or an aromatic compound may be added in the negative electrode. Examples of the surfactant and the aromatic compound are as those exemplified above. In view of dispersing the surfactant and the aromatic compound more uniformly in the negative electrode, the surfactant and the aromatic compound are preferably added in advance in the electrolyte used for the production of the negative electrode.

A compound containing a metal with high hydrogen overvoltage, such as indium and bismuth, may be added as appropriate in the negative electrode, for improvement of the corrosion resistance. Also, a very small amount of silicic acid or a silicic acid compound such as a potassium salt of silicic acid may be added as appropriate in the negative electrode, in order to suppress the growth of dendrites of zinc oxide and others.

(Negative Electrode Current Collector)

Examples of the material of the negative electrode current collector inserted into the gel negative electrode include a metal and an alloy. The negative electrode current collector preferably contains copper, and may be made of, for example, an alloy containing copper and zinc, such as brass. The negative electrode current collector may be plated with tin or the like, if necessary.

(Positive Electrode)

The positive electrode usually includes a manganese dioxide serving as a positive electrode active material, and in addition, an electrically conductive agent and an electrolyte. The positive electrode may further includes a binder, as needed.

The manganese dioxide is preferably an electrolytic manganese dioxide. The manganese dioxide has a crystal structure, such as an α-type, a β-type, a γ-type, a δ-type, an ε-type, a η-type, a λ-type, and a ramsdellite-type crystal structure.

The manganese dioxide is usually used in a powder form. In view of the packability of the positive electrode and the diffusibility of the electrolyte in the positive electrode, the average particle diameter (D50) of the manganese dioxide is, for example, 25 to 60 μm.

In view of the moldability and the suppression of the positive electrode expansion, the BET specific surface area of the manganese dioxide may be in a range of 20 to 50 $m^2/g$. The BET specific surface area is obtained by measuring and calculating a surface area using a BET equation, which is a theoretical equation of multilayer adsorption. The BET specific surface area can be measured using, for example, a specific surface area meter employing a nitrogen adsorption method.

Examples of the conductive agent include carbon black, such as acetylene black, and an electrically conductive carbon material, such as graphite. The graphite may be natural graphite, artificial graphite, and the like. The conductive agent may be in the form of fibers or the like, but is preferably in the form of powder. The average particle diameter (D50) of the conductive agent is, for example, 3 to 20 μm.

The content of the conductive agent in the positive electrode per 100 parts by mass of the manganese dioxide may be, for example, 3 to 10 parts by mass, and may be 5 to 9 parts by mass.

Silver or a silver compound, such as $Ag_2O$, AgO, $Ag_2O_3$, and $AgNiO_2$, may be added in the positive electrode, in order to allow it to absorb the hydrogen generated within the battery when the alkaline dry battery is charged by misuse.

The positive electrode can be formed by, for example, compression-molding a positive electrode material mixture including a positive electrode active material, an electrically conductive agent, an electrolyte, and if necessary, a binder, into a pellet shape. The positive electrode material mixture may be formed into flakes or granules and classified if necessary, and then compression-molded into a pellet shape.

Pellets thus formed are inserted into a battery case, which may be followed by secondary compression to bring them into close contact with the inner wall of the battery case, using a predetermined tool.

(Separator)

Examples of the material of the separator include cellulose and polyvinyl alcohol. The separator may be, for example, a nonwoven fabric mainly composed of fibers of the above material, or a cellophane- or polyolefin-based microporous film. A nonwoven fabric and a microporous film may be used in combination. Examples of the nonwoven fabric include a mixed nonwoven fabric mainly composed of cellulose fibers and polyvinyl alcohol fibers, and a mixed nonwoven fabric mainly composed of rayon fibers and polyvinyl alcohol fibers.

In FIG. 1, the cylindrically-shaped separator 4*a* and the bottom paper 4*b* are used to constitute the bottomed cylindrical separator 4. The bottomed cylindrical separator is not limited thereto, and may be a known-shaped separator commonly used in the field of alkaline dry batteries. The separator may be constituted of one sheet of separator, or when the separator is thin, may be constituted of a plurality of the separators stacked together. A thin sheet of separator may be wound a plurality of times, to form a cylindrically-shaped separator.

The thickness of the separator is, for example, 200 to 300 μm. The separator, preferably, as a whole has the above thickness, and when the separator is thin, a plurality of the separators may be stacked to have the thickness as above.

(Electrolyte)

The electrolyte is retained in the positive electrode, the negative electrode, and the separator. The electrolyte is, for example, an aqueous alkaline solution containing a potassium hydroxide. The potassium hydroxide concentration in the electrolyte is preferably 30 to 50 mass %. The electrolyte may further contain a zinc oxide. The zinc oxide concentration in the electrolyte is, for example, 1 to 5 mass %.

(Gasket)

Examples of the gasket include polyamide, polyethylene, and polypropylene. The gasket can be produced by, for example, injection molding using the above material, into a predetermined shape. In view of facilitating hydrogen permeation, 6,10-nylon, 6,12-nylon, and polypropylene are preferred as the material of the gasket. The gasket is usually provided with a thin-walled portion for explosion-proof purpose. The thin-walled portion is preferably provided annularly, in order to increase hydrogen permeation. A gasket 5 of FIG. 1 has an annular thin-walled portion 5*a*.

(Battery Case)

The battery case may be, for example, a bottomed cylindrical metal case. The battery case is made of, for example, a nickel-plated steel sheet. In order to improve the adhesion between the positive electrode and the battery case, the battery case is preferably a metal case whose inner surface is covered with carbon coating.

The present invention will be more specifically described below with reference to Examples and Comparative Examples. It is to be noted, however, the present invention is not limited to the following Examples.

Example 1

An AA-size cylindrical alkaline dry batteries (LR6) as illustrated in FIG. 1 was produced in the below-described procedures (1) to (3).

(1) Production of Positive Electrode

Electrolytic manganese dioxide powder (average particle diameter (D50): 35 μm) serving as a positive electrode active material was mixed with graphite powder (average particle diameter (D50): 8 μm) serving as an electrically conductive agent, to give a mixture. The mass ratio of the electrolytic manganese dioxide powder to the graphite powder was set to 92.4:7.6. The electrolytic manganese dioxide powder used here had a specific surface area of 41 $m^2/g$. An electrolyte was added to the mixture, which was stirred sufficiently and then compression-molded into a flake form, to give a positive electrode material mixture. The mass ratio of the mixture to the electrolyte was set to 100:1.5. The electrolyte used here was an aqueous alkaline solution containing potassium hydroxide (concentration: 35 mass %) and zinc oxide (concentration: 2 mass %).

The flake form of the positive electrode material mixture was crushed into a granular form, and classified through a 10- to 100-mesh sieve. Then, 11 g of the resultant granules were compression-molded into a predetermined hollow cylindrical shape of 13.65 mm in outer diameter, to form a positive electrode pellet 2. Two pellets were produced.

(2) Production of Negative Electrode

Zinc alloy powder (average particle diameter (D50): 130 μm) serving as a negative electrode active material, 1,3-propenesultone serving as an additive (sulfur-containing cyclic compound), an electrolyte, a gelling agent, and terephthalic acid were mixed, to give a gel negative electrode 3. The zinc alloy used here was a zinc alloy containing 0.02 mass % of indium, 0.01 mass % of bismuth, and 0.005 mass % of aluminum. The electrolyte used here had the same composition as that used for the production of the positive electrode. The gelling agent used here was a mixture of a cross-linked branched polyacrylic acid and a highly cross-linked linear sodium polyacrylate. The sulfur-containing cyclic compound was added in an amount of 0.1 parts by mass per 100 parts by mass of the negative electrode active material. The negative electrode active material, the electrolyte, and the gelling agent were mixed in a mass ratio of 100:50:1. The terephthalic acid was added in an amount of 0.15 parts by mass per 99.85 parts by mass of the electrolyte.

(3) Assembling of Alkaline Dry Battery

Varniphite available from Nippon Graphite Industries, Ltd. was applied to the inner surface of a bottomed cylindrical battery case 1 (outer diameter: 13.80 mm, wall thickness of cylindrical portion: 0.15 mm, height: 50.3 mm) made of a nickel-plated steel sheet, to form a carbon coating having a thickness of about 10 μm. Next, two positive electrode pellets were inserted one on the other into the battery case 1 and then compressed, to form a positive electrode 2 being in close contact with the inner wall of the battery case 1, with the carbon coating interposed therebetween. A bottomed cylindrical separator 4 was placed inside the positive electrode 2, and then, an electrolyte was injected thereto, to be impregnated into the separator 4. The electrolyte used here had the same composition as that used for the production of the positive electrode and the negative electrode. These were allowed to stand in this state for a predetermined period of time, to allow the electrolyte to permeate from the separator 4 into the positive electrode 2. Thereafter, 6 g of the gel negative electrode 3 was packed inside the separator 4.

The separator 4 was constituted of a cylindrically-shaped separator 4*a* and a bottom paper 4*b*. The cylindrically-shaped separator 4*a* and the bottom paper 4*b* were formed using a sheet of mixed nonwoven fabric (basis weight: 28 $g/m^2$) mainly composed of rayon fibers and polyvinyl alcohol fibers mixed in a mass ratio of 1:1. The thickness of the nonwoven fabric sheet used for the bottom paper 4*b* was 0.27 mm. The separator 4*a* was constituted by winding a 0.09-mm-thick nonwoven fabric sheet in three layers.

A negative electrode current collector 6 was prepared by press-working a typical brass (Cu content: approx. 65 mass %, Zn content: approx. 35 mass %) into a nail shape, and plating its surface with tin. The diameter of the shank of the negative electrode current collector 6 was set to 1.15 mm. The head of the negative electrode current collector 6 was electrically welded to a negative electrode terminal plate 7 made of a nickel-plated steel sheet. Then, the shank of the negative electrode current collector 6 was press-inserted into the through-hole provided at the center of a gasket 5 mainly composed of polyamide 6,12. In this way, a sealing unit 9 composed of the gasket 5, the negative electrode terminal plate 7, and the negative electrode current collector 6 was formed.

Next, the sealing unit 9 was placed at the opening of the battery case 1. At this time, the shank of the negative electrode current collector 6 was inserted into the negative electrode 3. The opening end of the battery case 1 was crimped onto the periphery of the negative electrode terminal plate 7, with the gasket 5 interposed therebetween, to seal the opening of the battery case 1. The outside surface of the battery case 1 was wrapped with an outer label 8. In this way, an alkaline dry battery A1 was fabricated.

Evaluation

The battery A1 produced in the above was subjected to the following evaluation test.

Four batteries A1 were prepared. Three out of the four batteries were connected in series, and the remaining one battery was connected in reverse polarity from the three batteries, to constitute a battery pack. The packed battery was connected with a 7.5-Ω resistance, and left to stand for 15 minutes after the resistance was connected. In other words, the period of time during which the battery connected in reverse polarity was charged was set to 15 minutes. When 15 minutes have passed since the resistance was connected, the battery connected in reverse polarity was checked for the presence or absence of the leaked electrolyte.

The above evaluation test was performed 20 times in total, and the number of the batteries in which electrolyte leakage occurred was counted, to determine a percentage thereof in the 20 batteries connected in reverse polarity, as a leakage occurrence percentage.

Note that the above evaluation test was performed by simulating a case where the battery is mistakenly connected in reverse polarity when installed in a medium-load device. The charging time of 15 minutes was set by taking into account the time required for a user to notice the abnormality of the device after installing batteries in the device, and remove the battery connected in reverse polarity from the device.

Example 2

An alkaline dry battery A2 was fabricated and evaluated in the same manner as in Example 1, except that ethylene sulfite was used in place of the 1,3-propenesultone as the additive, in the production of negative electrode.

Example 3

An alkaline dry battery A3 was fabricated and evaluated in the same manner as in Example 1, except that 1,3-propanesultone was used in place of the 1,3-propenesultone as the additive, in the production of negative electrode.

Example 4

An alkaline dry battery A4 was fabricated and evaluated in the same manner as in Example 1, except that ethylene sulfate was used in place of the 1,3-propenesultone as the additive, in the production of negative electrode.

Example 5

An alkaline dry battery A5 was fabricated and evaluated in the same manner as in Example 1, except that sulfolane was used in place of the 1,3-propenesultone as the additive, in the production of negative electrode.

Comparative Example 1

An alkaline dry battery X1 was fabricated and evaluated in the same manner as in Example 1, except that no 1,3-propenesultone was used as the additive, in the production of negative electrode.

The evaluation results are shown in Table 1.

TABLE 1

| Battery No. | Sulfur-containing cyclic compound | Content vs. 100 negative electrode active material (parts by mass) | Leakage occurrence percentage (%) |
|---|---|---|---|
| A1 | 1,3-propenesultone | 0.1 | 0 |
| A2 | Ethylene sulfite | 0.1 | 0 |
| A3 | 1,3-propanesultone | 0.1 | 0 |
| A4 | Ethylene sulfate | 0.1 | 0 |

TABLE 1-continued

| Battery No. | Sulfur-containing cyclic compound | Content vs. 100 negative electrode active material (parts by mass) | Leakage occurrence percentage (%) |
|---|---|---|---|
| A5 | Sulfolane | 0.1 | 0 |
| X1 | None | 0 | 100 |

In the batteries A1 to A5 of Examples 1 to 5 in which the additive was added in the negative electrode, the leakage occurrence percentage was 0%, which was apparently lower than that in the battery X1 of Comparative Example 1.

Examples 6 and 7

Alkaline dry batteries A6 and A7 were fabricated and evaluated in the same manner as in Example 1, except that the additive was added in an amount (per 100 parts by mass of the negative electrode active material) as shown in Table 2, in the production of negative electrode. The evaluation results are shown in Table 2.

TABLE 2

| Battery No. | Sulfur-containing cyclic compound | Content vs. 100 negative electrode active material (parts by mass) | Leakage occurrence percentage (%) |
|---|---|---|---|
| A6 | 1,3-propenesultone | 0.02 | 50 |
| A1 | 1,3-propenesultone | 0.1 | 0 |
| A7 | 1,3-propenesultone | 1.0 | 0 |

Examples 8 and 9

Alkaline dry batteries A8 and A9 were fabricated and evaluated in the same manner as in Example 2, except that the additive was added in an amount (per 100 parts by mass of the negative electrode active material) as shown in Table 3, in the production of negative electrode. The evaluation results are shown in Table 3.

TABLE 3

| Battery No. | Sulfur-containing cyclic compound | Content vs. 100 negative electrode active material (parts by mass) | Leakage occurrence percentage (%) |
|---|---|---|---|
| A8 | Ethylene sulfite | 0.02 | 50 |
| A2 | Ethylene sulfite | 0.1 | 0 |
| A9 | Ethylene sulfite | 1.0 | 0 |

Examples 10 and 11

Alkaline dry batteries A10 and A11 were fabricated and evaluated in the same manner as in Example 3, except that the additive was added in an amount (per 100 parts by mass of the negative electrode active material) as shown in Table 4, in the production of negative electrode. The evaluation results are shown in Table 4.

TABLE 4

| Battery No. | Sulfur-containing cyclic compound | Content vs. 100 negative electrode active material (parts by mass) | Leakage occurrence percentage (%) |
|---|---|---|---|
| A10 | 1,3-propanesultone | 0.02 | 50 |
| A3 | 1,3-propanesultone | 0.1 | 0 |
| A11 | 1,3-propanesultone | 1.0 | 0 |

Examples 12 and 13

Alkaline dry batteries A12 and A13 were fabricated and evaluated in the same manner as in Example 4, except that the additive was added in an amount (per 100 parts by mass of the negative electrode active material) as shown in Table 5, in the production of negative electrode. The evaluation results are shown in Table 5.

TABLE 5

| Battery No. | Sulfur-containing cyclic compound | Content vs. 100 negative electrode active material (parts by mass) | Leakage occurrence percentage (%) |
|---|---|---|---|
| A12 | Ethylene sulfate | 0.02 | 50 |
| A4 | Ethylene sulfate | 0.1 | 0 |
| A13 | Ethylene sulfate | 1.0 | 0 |

Examples 14 and 15

Alkaline dry batteries A14 and A15 were fabricated and evaluated in the same manner as in Example 5, except that the additive was added in an amount (per 100 parts by mass of the negative electrode active material) as shown in Table 6, in the production of negative electrode. The evaluation results are shown in Table 6.

TABLE 6

| Battery No. | Sulfur-containing cyclic compound | Content vs. 100 negative electrode active material (parts by mass) | Leakage occurrence percentage (%) |
|---|---|---|---|
| A14 | Sulfolane | 0.02 | 50 |
| A5 | Sulfolane | 0.1 | 0 |
| A15 | Sulfolane | 1.0 | 0 |

In all of the Examples, the leakage occurrence percentage was lower than that in the battery X1 of Comparative Example 1. Especially when the additive amount in the negative electrode was 0.1 parts by mass or more and 1 part by mass or less per 100 parts by mass of the negative electrode active material, the leakage occurrence percentage was significantly reduced.

INDUSTRIAL APPLICABILITY

According to an embodiment of the present invention, application to all devices using a dry battery as a power source is possible. For example, it is suitably applicable to a portable audio device, a portable game player, a light, a toy, and the like.

REFERENCE SIGNS LIST

1 battery case
2 positive electrode
3 negative electrode
4 bottomed cylindrical separator
4*a* cylindrically-shaped separator
4*b* bottom paper
5 gasket
5*a* thin-walled portion
6 negative electrode current collector
7 negative electrode terminal plate
8 outer label
9 sealing unit

The invention claimed is:

1. An alkaline dry battery, comprising:

a positive electrode; a negative electrode; a separator disposed between the positive electrode and the negative electrode; and an alkaline electrolyte retained in the positive electrode, the negative electrode, and the separator, the negative electrode including a negative electrode active material containing zinc, and an additive, the additive including a sulfur-containing cyclic compound, wherein the sulfur-containing cyclic compound has a ring structure having a sulfur atom, and is selected from the group consisting of, 1,3-propenesultone (1-propene 1,3-sultone), 1,4-butanesultone, 1,5-pentanesultone, 1-methyl-1,3-propanesultone, 2-methyl-1,3-propanesultone, 3-methyl-1,3-propanesultone, 2-trifluoromethyl-1,3-propanesultone, 1-fluoro-1,3-propanesultone, 2-fluoro-1,3-propanesultone, 3-fluoro-1,3-propanesultone, 1-methyl-1,3-propenesultone, 2-methyl-1,3-propenesultone, 3-methyl-1,3-propenesultone, 3-fluoro-1,3-propenesultone, 2-trifluoromethyl-1,3-propenesultone, butylene sulfite, vinylene sulfite, fluoroethylene sulfite, ethylene sulfate (1,3,2-dioxathiolane 2,2-dioxide), sulfolane, 2-methylsulfolane, 3-methylsulfolane, 2-fluorosulfolane, and 3-fluorosulfolane, wherein the sulfur-containing cyclic compound is retained in the negative electrode in an amount of 0.02 parts by mass or more and 1 part by mass or less per 100 parts by mass of the negative electrode active material included in the negative electrode, and wherein the alkaline electrolyte is gelled by a gelling agent.

2. The alkaline dry battery according to claim 1, where the ring structure is a five-membered ring.

3. The alkaline dry battery according to claim 1, wherein the sulfur-containing cyclic compound is a sulfur-containing cyclic ester.

4. The alkaline dry battery according to claim 3, wherein the sulfur-containing cyclic ester includes at least one selected from the group consisting of a sulfate ester, a sulfite ester, and a sulfonate ester.

5. The alkaline dry battery according to claim 1, wherein the sulfur-containing cyclic compound includes at least one selected from the group consisting of, 1,3-propenesultone, ethylene sulfite, ethylene sulfate, and sulfolane.

6. The alkaline dry battery according to claim 1, wherein the positive electrode also retains the sulfur-containing cyclic compound.

* * * * *